US008056073B2

(12) United States Patent
Petersen et al.

(10) Patent No.: US 8,056,073 B2
(45) Date of Patent: Nov. 8, 2011

(54) METHOD, COMPUTER PROGRAM PRODUCT, AND SYSTEM FOR MERGING MULTIPLE SAME CLASS INSTANCE STATES

(75) Inventors: Mark Petersen, Poughkeepsie, NY (US); William E. Ansley, Round Rock, TX (US); Christopher Schnabel, Poughkeepsie, NY (US); Karyn M. Hurley, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 975 days.

(21) Appl. No.: 11/970,734

(22) Filed: Jan. 8, 2008

(65) Prior Publication Data

US 2009/0178024 A1 Jul. 9, 2009

(51) Int. Cl.
*G06F 9/44* (2006.01)
*G06F 7/00* (2006.01)

(52) U.S. Cl. ........ 717/170; 717/114; 717/116; 717/121; 707/616; 707/695

(58) Field of Classification Search .................. None
See application file for complete search history.

(56) References Cited

U.S. PATENT DOCUMENTS

| | | | |
|---|---|---|---|
| 6,279,015 B1 | 8/2001 | Fong et al. | |
| 6,598,219 B1 | 7/2003 | Lau | |
| 6,742,003 B2 | 5/2004 | Heckerman et al. | |
| 6,904,588 B2 | 6/2005 | Reddy et al. | |
| 6,912,707 B1 | 6/2005 | Fontes, Jr. | |
| 7,149,730 B2 | 12/2006 | Mullins et al. | |
| 7,150,003 B2 * | 12/2006 | Naumovich et al. | 717/108 |
| 7,219,332 B2 * | 5/2007 | Gouge et al. | 717/121 |
| 7,251,669 B1 * | 7/2007 | Arora | 707/695 |
| 7,346,627 B2 * | 3/2008 | Ramanathan et al. | 707/616 |
| 7,383,534 B1 * | 6/2008 | Agbabian et al. | 717/108 |
| 7,567,976 B1 * | 7/2009 | Betz et al. | 707/999.102 |
| 7,725,878 B1 * | 5/2010 | Long et al. | 717/116 |
| 7,908,601 B2 * | 3/2011 | Clemm et al. | 717/170 |
| 2006/0075323 A1 * | 4/2006 | Singh et al. | 715/500 |
| 2006/0218543 A1 | 9/2006 | Boger | |
| 2007/0006196 A1 * | 1/2007 | Tjong et al. | 717/114 |
| 2007/0294318 A1 * | 12/2007 | Arora et al. | 707/202 |

OTHER PUBLICATIONS

Kyung-Goo Doh, Composing Programming Languages by Combining Action-Semantics Modules, 2003, BRICS Report Series, ISSN 0909-0878, 42 pages <http://www.sciencedirect.com/science/article/pii/S1571066104809228>.*

Randall Hyde, Classes and Objects, 2001, pp. (1059-1096) <http://homepage.mac.com/randyhyde/webster.cs.ucr.edu/www.artofasm.com/Linux/PDFs/ClassesAndObjects.pdf>.*

Krishnamohan Balachandran, Jan Buzydlowski, Garett Dworman, Steven O. Kimbrough, Tate Shafer, and William J. Vachula, MOTC: An Interactive Aid for Multidimensional Hypothesis Generation, Journal of Management Information Systems/Summer 1999, vol. 16, No. 1, pp. 17-36.

Christof Lutteroth and Gerald Weber, User Interface Layout with Ordinal and Linear Constraints, 2006, pp. 8, Department of Computer Science, The University of Auckland, 38 Princes Street, Auckland 1020, New Zealand. Australian Computer Society, Inc. This paper appeared at the Seventh Australasian User Interface Conference (AUIC2006), Hobart, Australia. Conferences in Research and Practice in Information Technology (CRPIT), vol. 50.

Nathaniel Duca, Krzysztof Niski, Jonathan Bilodeau, Matthew Bolitho, Yuan Chen, Jonathan Cohen, A Relational Debugging Engine for the Graphics Pipeline, John Hopkins University, 2005, by the Association for Computing Machinery, Inc., pp. 453-463.

* cited by examiner

*Primary Examiner* — Thuy Dao
*Assistant Examiner* — Anibal Rivera
(74) *Attorney, Agent, or Firm* — Wenjie Li

(57) ABSTRACT

A method, computer program product, and system for enabling the merging of a plurality of instance variables into a new composite same-class instance having the same instance variables with values determined by a user. Same-class instances are arranged in tabular format and are provided with selection buttons to allow the user to make selections of the desired instance variable values.

15 Claims, 4 Drawing Sheets

METHOD, COMPUTER PROGRAM PRODUCT, AND SYSTEM FOR MERGING MULTIPLE SAME CLASS INSTANCE STATES

BACKGROUND OF THE INVENTION

The invention relates generally to programming language data structures and more specifically to manipulation of data associated with object-oriented programming class instances.

Object-oriented programs are based on "classes" (that is, a template that defines the state and the capabilities of an object; the abstract characteristics of a thing (an "object")); "objects" (a particular instance of a class), and data. Typically, an object-oriented program creates and works with multiple object instances (or "same-class instances") of a class, that is, multiple objects that are members of that class. Each same-class instance may be characterized by one or more instance variables. Each instance variable, in turn, may have data, or "instance variable values" associated with it.

Current graphical user interfaces address mapping needs for HTML and graphical object structures, and provide tools for reconciliation of database records based on tiered queries and database retrievals. However, there is a need for a simple method to merge same-class instance variable values using a graphical user interface to create a composite same-class instantiation from preferred instance variable values selected by a user.

BRIEF SUMMARY OF THE INVENTION

Briefly stated, in a first aspect the invention is a method for comparing and combining information associated with a plurality of separate same-class instances developed by an object-oriented application program. The method comprises a step of providing an object-oriented application program. The application program is used to develop a plurality of same-class instances, each same-class instance having N instance variables, wherein N is an integer greater than 0. Values are assigned to at least some of the instance variables. A graphical user interface is provided which displays the plurality of same-class instances in a tabular form, with the same-class instances presented in columns such that corresponding same-class instance variables are aligned in rows. A plurality of selection buttons are provided, each selection button being uniquely associated with one of the instance variables. A user selects N selection buttons to identify values associated with each of the instance variables to be integrated into a composite same-class instance. The selected instance variable values are merged into the composite same-class instance.

In a second aspect, the invention is a computer program product comprising one or more computer-readable storage media containing instructions executable by a computer for comparing and combining information associated with a plurality of separate same-class instances developed by an object-oriented application program. Each same-class instance has at least one instance variable, and each instance variable has a value. The computer program product comprises first computer program code operative to provide a graphical user interface which displays the plurality of same-class instances in a tabular form. The same-class instances are presented in columns such that corresponding same-class instance variables are aligned in rows. Second computer program code is operative to provide a plurality of selection buttons, each selection button being uniquely associated with one of the instance variable values. Third computer program code is operative to allow a user to select selection buttons to identify values associated with each of the instance variables to be integrated into a composite same-class instance. Fourth computer program code is operative to merge the identified instance variable values into a composite same-class instance.

In a third aspect, the invention is a computer system supporting comparison and combination of information associated with a plurality of separate same-class instances developed by an object-oriented application program. The computer system comprises a processor; a memory device for storing application programs; and a display outputting information to a user. An object-oriented application program executable on the processor is provided, the application program supporting creation of a plurality of same-class instances, each same-class instance having at least one instance variable, each instance variable having a value. A utility program, executable on the processor for comparing and combining separate same-class instances into a composite same-class instance is provided. The utility program operates to create a graphical user interface which displays the plurality of same-class instances, wherein the graphical user interface presents the same-class instances in columnar form such that corresponding same-class instance variables are aligned in rows. The utility program further operates to create a plurality of selection buttons, each selection button being uniquely associated with one of the instance variable values, and to allow selection by the user of selection buttons to identify values associated with each of the instance variables to be integrated into a composite same-class instance. Still further, the utility program operates to merge the multiplicity of instance variables into the composite same-class instance.

BRIEF DESCRIPTION OF THE SEVERAL VIEWS OF THE DRAWINGS

The following detailed description of preferred embodiments of the invention will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1A:
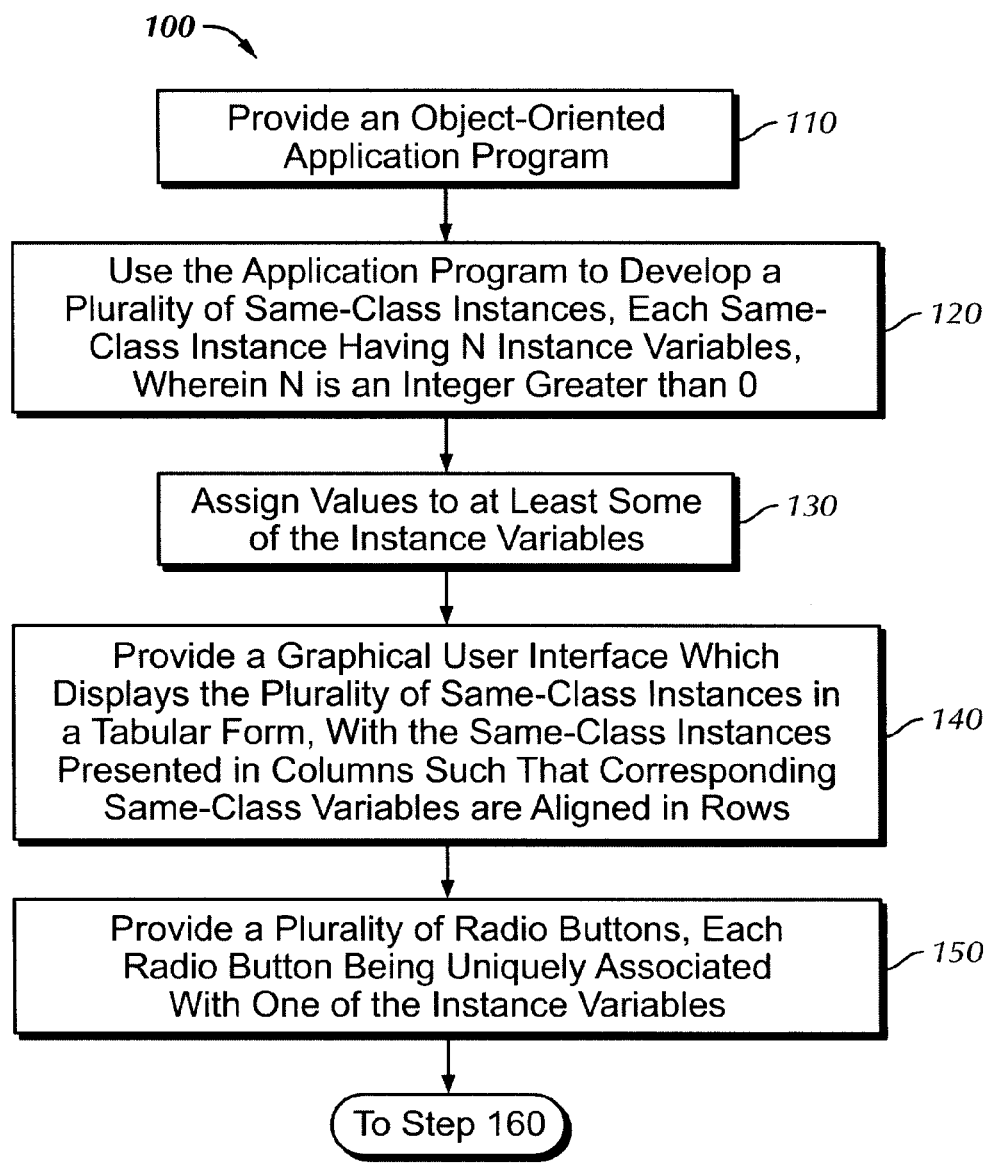
FIGS. 1A and 1B are a block diagram of steps of a method in accordance with a preferred embodiment of the present invention.

As used herein, when introducing elements of the present invention or the preferred embodiment(s) thereof, the articles "a", "an", "the" and "said" are intended to mean that there are one or more of the elements. Throughout the drawings, the same reference numerals or letters are used to designate like or equivalent elements. Detailed descriptions of known functions and constructions unnecessarily obscuring the subject matter of the present invention have been omitted for clarity. The drawings are not necessarily drawn to scale.

Figure 1B:
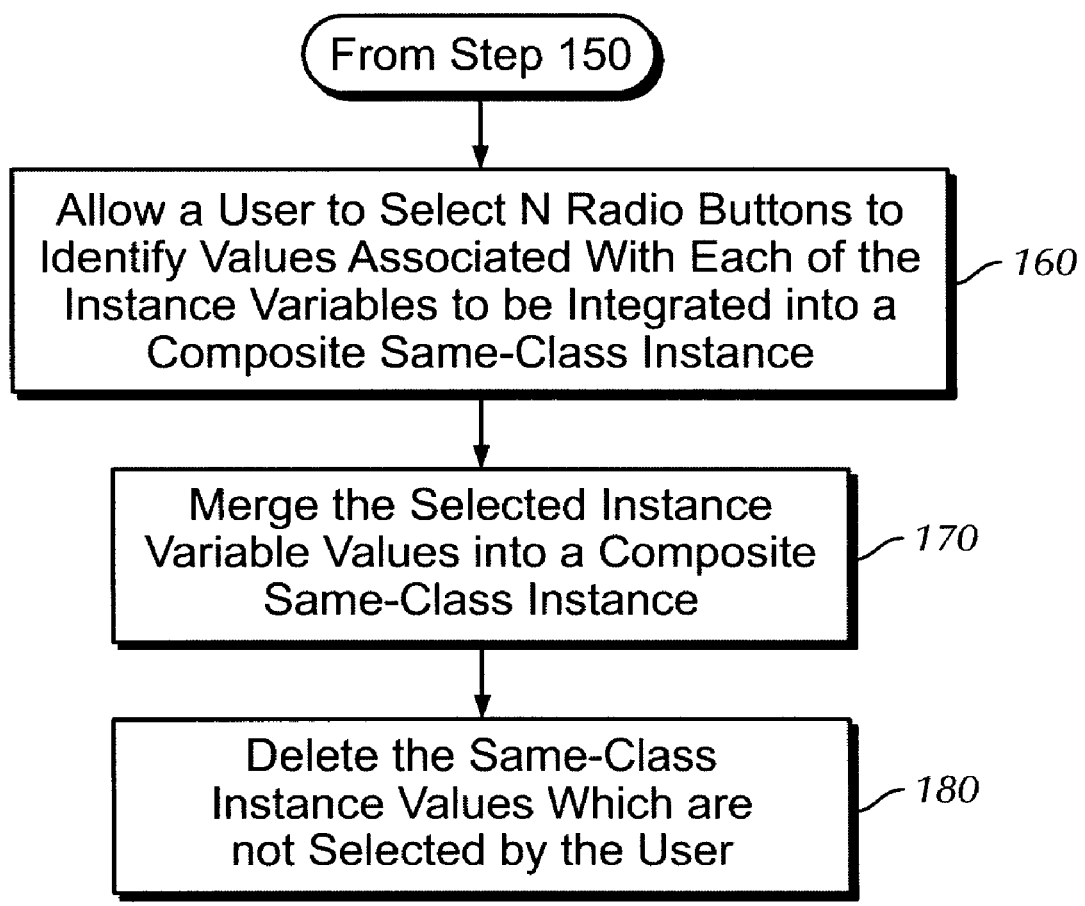
Figure 2:
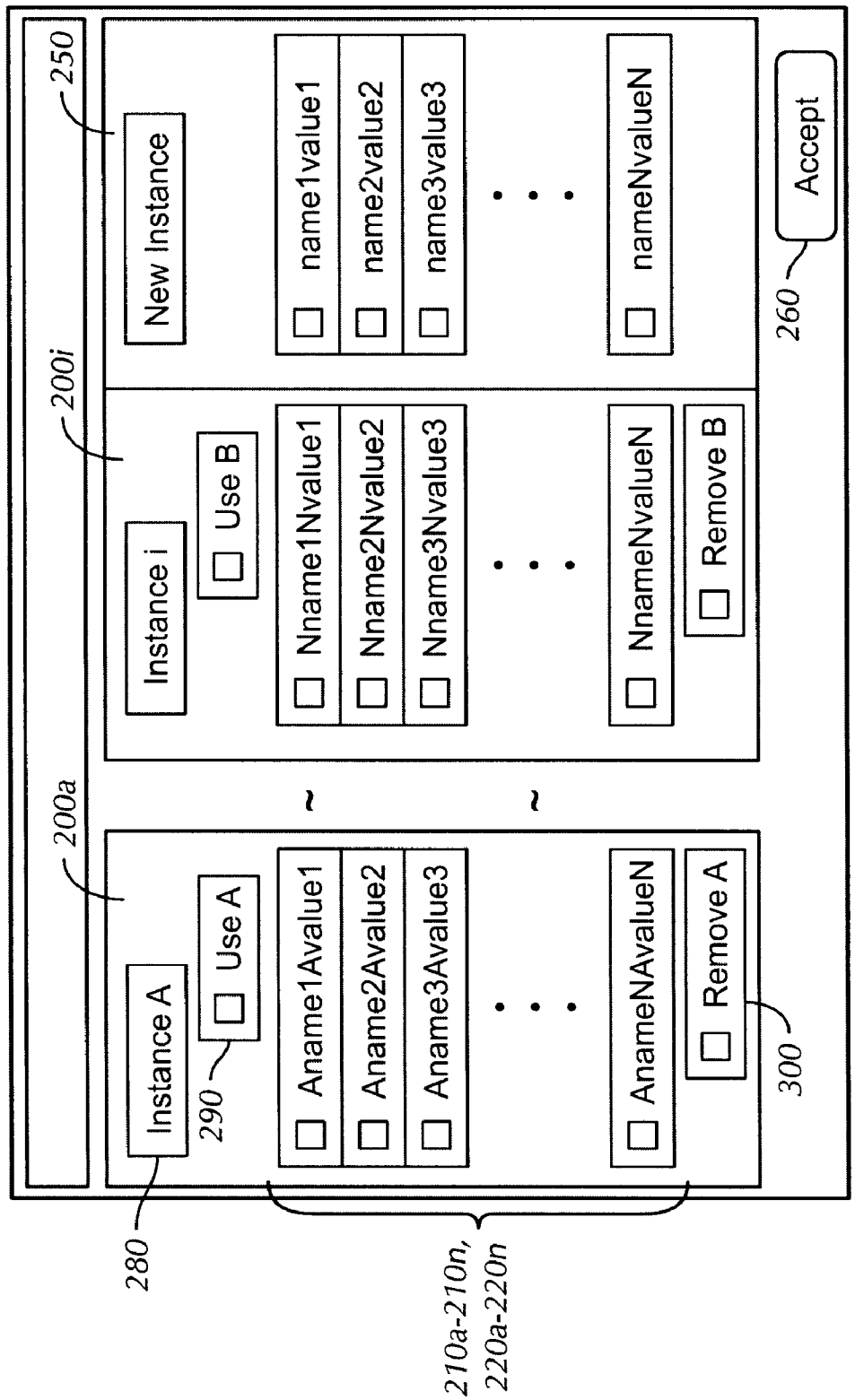
FIG. 2 is a schematic representation of elements of a graphical user interface in accordance with the method of FIGS. 1A and 1B.
Figure 3:
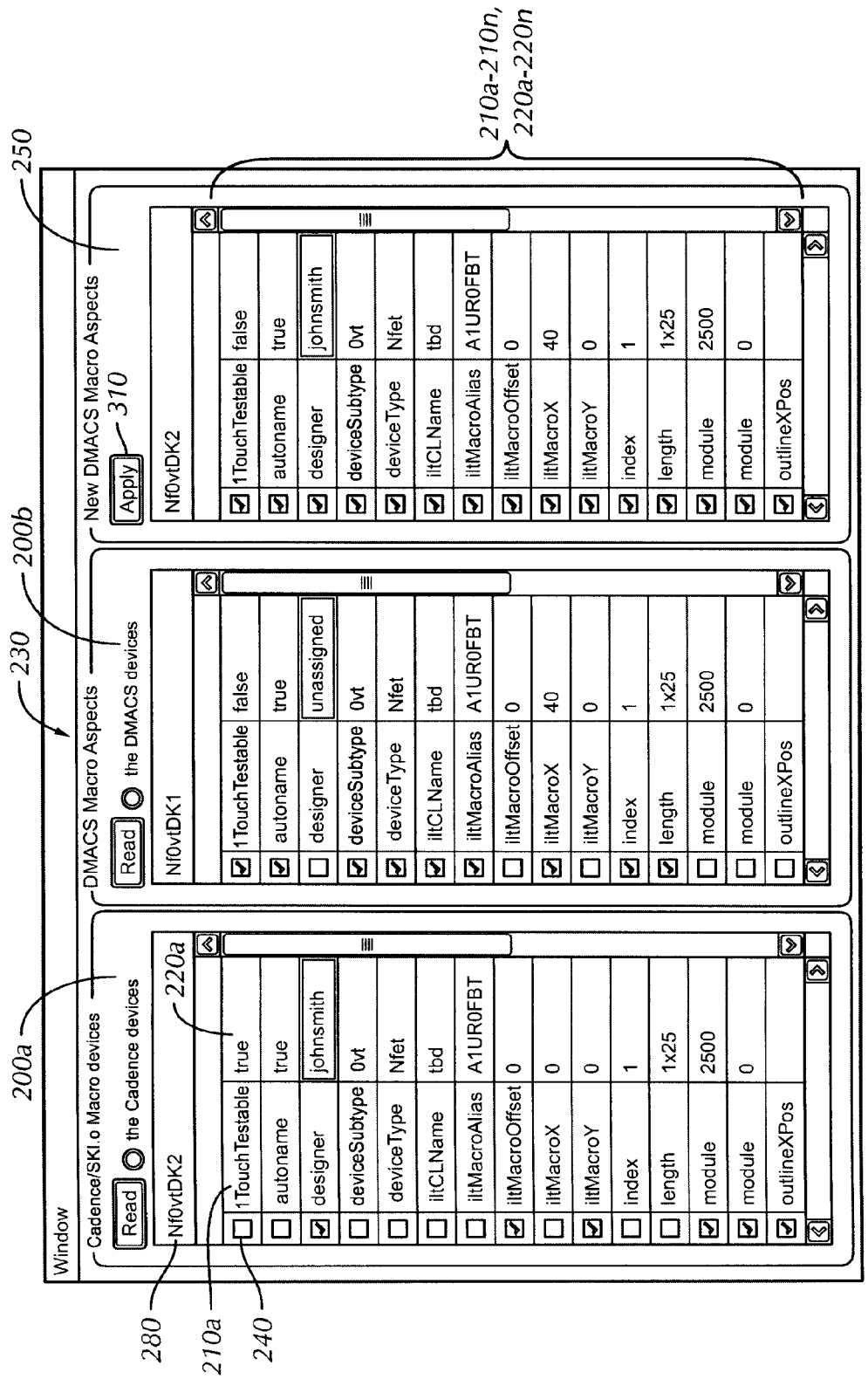
FIG. 3 is representation of one preferred implementation of the graphical user interface of FIG. 2.

Referring to the drawings, and initially to FIGS. 1A and 1B, there is shown a presently preferred method 100 of comparing and combining information associated with a plurality of separate same-class instances developed by an object-oriented application program. While steps of the method 100 are identified herein as "first", "second", and so forth, it is to be understood that such nomenclature is for convenience only, and does not imply that the steps must be performed in a specific sequential order. Given that understanding, in a first step 110, the object-oriented application program is provided. The object-oriented application program may be, for example, the Distribution, Manufacturing, Accounting, Costing and Simulation (DMACS®) Enterprise Resource Planning (ERP) software available from ONLINE Software Labs, Inc. of Richboro, Pa. With reference also to FIG. 2, in a second step 120, the application program is used to develop a plurality (of arbitrary number i) of same-class instances 200a to 200i, each same-class instance 200 having N instance variables 210a to 210n, wherein N is an integer greater than 0. In a third step 130, values 220a to 220n are assigned to at least some of the instance variables 210. With reference also to FIG. 3, in a fourth step 140, a graphical user interface 230, which displays the plurality of same-class instances in a tabular form, is provided. The graphical user interface 230 presents the same-class instances 200 in columns such that corresponding same-class instance variables 210 are aligned in rows. In a fifth step 150, selection means, such as a plurality of selection buttons 240, are provided, allowing a user to select instance variable values 220. Each selection button 240 is uniquely associated with one of the instance variables 210, and its corresponding instance variable value 220. In a sixth step 160, a user selects N selection buttons 240 to identify values associated with each of the instance variable values 220 to be integrated into a composite same-class instance 250. Preferably, as illustrated in FIGS. 2 and 3, the graphical user interface 230 displays the composite same-class instance 250 as an additional column. In a seventh step 170, the selected instance variable values 220 are merged into the composite same-class instance 250. Preferably, in an eighth step 180, same-class instance variable values 220 which are not selected by the user are automatically deleted.

Optionally and preferably, the graphical user interface 230 is provided with means, such as a selection button 260, allowing the user to accept the merge selections. Further optionally and preferably, a name 280 of a given same-class instance 200 is displayed as a column header in the graphical user interface 230. Furthermore, a step (not illustrated in FIGS. 1A and 1B) may be included for providing input means (such as selection button 290) to allow the user to select all of the instance state variable values 220a-n associated with a given instance state 200 to populate the composite same class instance state 250. Still further, the method 100 may include a step (not illustrated) of providing input means (such as selection button 300) to allow the user to deactivate all data 220a-n associated with a given same-class instance 200. Still further, the method 100 may include a step (not illustrated) of providing input means, such as selection button 310, operative to allow the user to refresh display of the instance variable values 220 selected for the composite same class instance state 250.

Another preferred embodiment of the present invention is a computer program product comprising one or more computer-readable storage media containing instructions executable by a computer for comparing and combining information associated with a plurality of separate same-class instances 200 developed by an object-oriented application program. Each same-class instance 200 has at least one instance variable 210, and each instance variable 210 has a value 220. The computer program product comprising first computer program code (not illustrated) operative to provide the graphical user interface 230 which displays the plurality of same-class instances 200 in a tabular form. As discussed above and illustrated in FIG. 3, the same-class instances 200 are presented in columns such that corresponding same-class instance variables 220 are aligned in rows. Second computer program code (not illustrated) is operative to provide the plurality of selection buttons 240. Third computer program code (not illustrated) is operative to allow the user to select selection buttons to identify values 220 associated with each of the instance variables 210 to be integrated into the composite same-class instance 250. Fourth computer program code (not illustrated) is operative to merge the identified instance variable values into the composite same-class instance 250.

The computer program product preferably further comprises additional computer program code (not illustrated) operative to delete same-class instance values which are not selected by the user. Additionally, the computer program product further comprises additional computer program code (not illustrated) operative to allow the user to apply the merge selections. Still further, the computer program product further comprises additional computer program code (not illustrated) operative to allow the user to select all of the instance state variable values 220a-220n associated with a given instance state to populate the composite same class instance state 250. Preferably, the computer program product further comprises additional computer program code (not illustrated) operative to allow the user to deactivate all instance variable values 220 associated with a given same-class instance 200. The computer program further preferably comprises additional computer program code (not illustrated) operative to allow the user to refresh display of the instance variable values 220 selected for the composite same class instance state 250.

Yet another presently preferred embodiment of the invention is a computer system supporting comparison and combination of information associated with a plurality of separate same-class instances developed by an object-oriented application program. The computer system (not illustrated) comprises a processor, a memory device for storing application programs, and a display outputting information to a user. An object-oriented application program is provided and is executable on the processor. The application program supports creation of a plurality of same-class instances 200, each same-class instance 200 having at least one instance variable 210, and each instance variable 210 having a value 220. A utility program (not illustrated) is executable on the processor for comparing and combining separate same-class instances 200 into a composite same-class instance 250. The utility program is operative to create the graphical user interface 230 which displays the plurality of same-class instances 200. The graphical user interface 230 presents the same-class instances 200 in columnar form such that corresponding same-class instance variables 210 are aligned in rows. The utility program is further operative to create the plurality of selection buttons 240, each selection button being uniquely associated with one of the instance variable values 220. Still further, the utility program is operative to allow selection by the user of selection buttons 240 to identify values 220 associated with each of the instance variables 210 to be integrated into the composite same-class instance 250. The utility program is operative to merge the multiplicity of instance variables 220 into the composite same-class instance 250.

From the foregoing it can be seen that the present invention provides a computing system, method, and computer program product to efficiently merge same-class instance variable values using a graphical user interface to create a composite same-class instantiation from preferred instance variable values selected by a user.

It will be appreciated by those skilled in the art that changes could be made to the embodiments described above without departing from the broad inventive concept thereof. It is to be understood, therefore, that this invention is not limited to the particular embodiments disclosed, but it is intended to cover modifications within the spirit and scope of the present invention as defined by the appended claims.

That which is claimed is:

1. A method for comparing and combining information associated with a plurality of separate same-class instances developed by an object-oriented application program comprising steps of:
   providing an object-oriented application program;
   using the application program to develop a plurality of same-class instances, each same-class instance having N instance variables, wherein N is an integer greater than 0:
   assigning values to at least some of the instance variables;
   providing a graphical user interface which displays the plurality of same-class instances in a tabular form, with the same-class instances presented in columns such that each same-class instance with its same-class instance variables are presented in a separate column and such that same-class instance variables in each column are aligned in rows with corresponding same-class instance variables in adjacent columns, wherein the graphical user interface further displays a composite same-class instance as a column additional to the columns for the same-class instances;
   providing a plurality of selection buttons, each selection button being uniquely associated with one of the instance variables;
   selection by a user of N selection buttons to identify values associated with each of the instance variables to be integrated into the composite same-class instance; and
   merging the selected instance variable values into the composite same-class instance in the graphical user interface with the composite same-class instance.

2. The method of claim 1 further comprising a step of deleting same-class instance values which are not selected by the user.

3. The method of claim 1 further comprising a step of allowing the user to apply the merge selections.

4. The method of claim 1, wherein a name of a same-class instance is displayed as a column header in the graphical user interface.

5. The method of claim 1, further comprising a step of providing input means to allow the user to select all of the instance state variable values associated with that instance state to populate the composite same class instance state.

6. The method of claim 1, further comprising a step of providing input means to allow the user to deactivate all instance variable values associated with a given same-class instance.

7. The method of claim 1, further comprising a step of providing input means operative to allow the user to refresh display of the instance variable values selected for the composite same class instance state.

8. A computer program product comprising one or more computer-readable storage media containing instructions executable by a computer for comparing and combining information associated with a plurality of separate same-class instances developed by an object-oriented application program, wherein each same-class instance has at least one instance variable, each instance variable having a value; the computer program product comprising:
   first computer program code operative to provide a graphical user interface which displays the plurality of same-class instances in a tabular form, with the same-class instances presented in columns such that each same-class instance with its same-class instance variables are presented in a separate column and such that same-class instance variables in each column are aligned in rows with corresponding same-class instance variables in adjacent columns, wherein the graphical user interface further displays a composite same-class instance as a column additional to the columns for the same-class instances;
   second computer program code operative to provide a plurality of selection buttons, each selection button being uniquely associated with one of the instance variable values;
   third computer program code operative to allow a user to select selection buttons to identify values associated with each of the instance variables to be integrated into the composite same-class instance; and
   fourth computer program code operative to merge the identified instance variable values into the composite same-class instance in the graphical user interface with the composite same-class instance.

9. The computer program product of claim 8 further comprising additional computer program code operative to delete same-class instance values which are not selected by the user.

10. The computer program product of claim 8, further comprising additional computer program code operative to allow the user to apply the merge selections.

11. The computer program product of claim 8, wherein a name of a same-class instance is displayed as a column header in the graphical user interface.

12. The computer program product of claim 8, further comprising additional computer program code operative to allow the user to select all of the instance state variable values associated with that instance state to populate the composite same class instance state.

13. The computer program product of claim 8, further comprising additional computer program code operative to allow the user to deactivate all instance variable values associated with a given same-class instance.

14. The computer program product of claim 8, further comprising additional computer program code operative to allow the user to refresh display of the instance variable values selected for the composite same class instance state.

15. A computer system supporting comparison and combination of information associated with a plurality of separate same-class instances developed by an object-oriented application program, comprising:
   a processor;
   a memory device for storing application programs;
   a display outputting information to a user;
   an object-oriented application program executable on the processor, the application program supporting creation of a plurality of same-class instances, each same-class instance having at least one instance variable, each instance variable having a value; and
   a utility program, executable on the processor for comparing and combining separate same-class instances into a composite same-class instance, operative to:
   create a graphical user interface which displays the plurality of same-class instances, wherein the graphical user interface presents the same-class instances in columnar form such that each same-class instance with its same-class instance variables are presented in a separate column and such that same-class instance variables in each column are aligned in rows with corresponding same-class instance variables in adjacent columns, wherein the graphical user interface further displays a composite same-class instance as a column additional to the columns for the same-class instances;

create a plurality of selection buttons, each selection button being uniquely associated with one of the instance variable values;

allow selection by the user of selection buttons to identify values associated with each of the instance variables to be integrated into a composite same-class instance; and responsive to selection by the user of selection buttons, merge the multiplicity of instance variables into the composite same-class instance in the graphical user interface with the composite same-class instance.

\* \* \* \* \*